(12) United States Patent
Kitagawa

(10) Patent No.: US 7,908,411 B2
(45) Date of Patent: Mar. 15, 2011

(54) DATA TRANSFER DEVICE AND MOBILE TELEPHONE

(75) Inventor: Daisaku Kitagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 319 days.

(21) Appl. No.: 12/306,085

(22) PCT Filed: Sep. 13, 2007

(86) PCT No.: PCT/JP2007/067844
§ 371 (c)(1),
(2), (4) Date: Dec. 22, 2008

(87) PCT Pub. No.: WO2008/035616
PCT Pub. Date: Mar. 27, 2008

(65) Prior Publication Data
US 2010/0217897 A1 Aug. 26, 2010

(30) Foreign Application Priority Data
Sep. 20, 2006 (JP) .................................. 2006-254314

(51) Int. Cl.
*G06F 13/00* (2006.01)
*H04K 1/00* (2006.01)
(52) U.S. Cl. ............ 710/33; 713/150; 713/189; 380/247
(58) Field of Classification Search .............. 710/29–35; 713/189–193, 153–163; 380/37–43, 247–250
See application file for complete search history.

(56) References Cited

U.S. PATENT DOCUMENTS

| 6,501,840 B1 * | 12/2002 | Saijo .............................. 380/37 |
| 7,197,171 B2 * | 3/2007 | Yuzefovich et al. ........... 382/131 |
| 7,313,704 B2 * | 12/2007 | Kashiwada .................... 713/191 |
| 7,386,734 B2 * | 6/2008 | Wann et al. .................... 713/189 |
| 7,509,501 B2 * | 3/2009 | Park et al. ...................... 713/193 |
| 2004/0148512 A1 * | 7/2004 | Park et al. ...................... 713/193 |
| 2005/0237560 A1 | 10/2005 | Nakai et al. |
| 2006/0023877 A1 | 2/2006 | Tsuruga |

FOREIGN PATENT DOCUMENTS

| JP | 6-60012 | 3/1994 |
| JP | 2005-309847 | 11/2005 |
| JP | 2006-39000 | 2/2006 |

OTHER PUBLICATIONS

International Search Report issued Dec. 26, 2007 in the International (PCT) Application of which the present application is the U.S. National Stage.

* cited by examiner

*Primary Examiner* — Christopher B Shin
(74) *Attorney, Agent, or Firm* — Wenderoth, Lind & Ponack, L.L.P.

(57) ABSTRACT

A cryptographic processing device 100 includes an interruption timing judgment circuit 101. The interruption timing judgment circuit 101 includes an interruption timing judgment register 101a, a transfer state reference unit 101b, and an interruption timing judgment unit 101c. The interruption timing judgment register 101a stores a table 200 used by the interruption timing judgment unit 101c to judge whether to interrupt transfer performed by a DMAC 102. The transfer state reference unit 101b monitors how many bytes among blocks read from a memory 14 the DMAC 102 has input into a cryptographic computing circuit 103. The interruption timing judgment unit 101c judges whether to switch a transfer target during transfer of image data by the DMAC 102, based on the table 200 stored in the interruption timing judgment register 101a and a result of the monitoring by the transfer state reference unit 101b (i.e. the number of transferred bytes).

8 Claims, 10 Drawing Sheets

FIG. 4

| DATA TYPE | JUDGMENT NECESSITY | UN-INPUT DATA THRESHOLD | RESIDUAL DATA THRESHOLD |
|---|---|---|---|
| 1 | NECESSARY | 3 2 BYTES | 4 BYTES |
| 2 | UNNECESSARY | | |
| 3 | NECESSARY | 3 2 BYTES | 0 BYTES |
| 4 | NECESSARY | 6 4 BYTES | 8 BYTES |
| 5 | NECESSARY | 6 4 BYTES | 0 BYTES |
| - - | - - | - - | - - |
| 1 6 | UNNECESSARY | | |

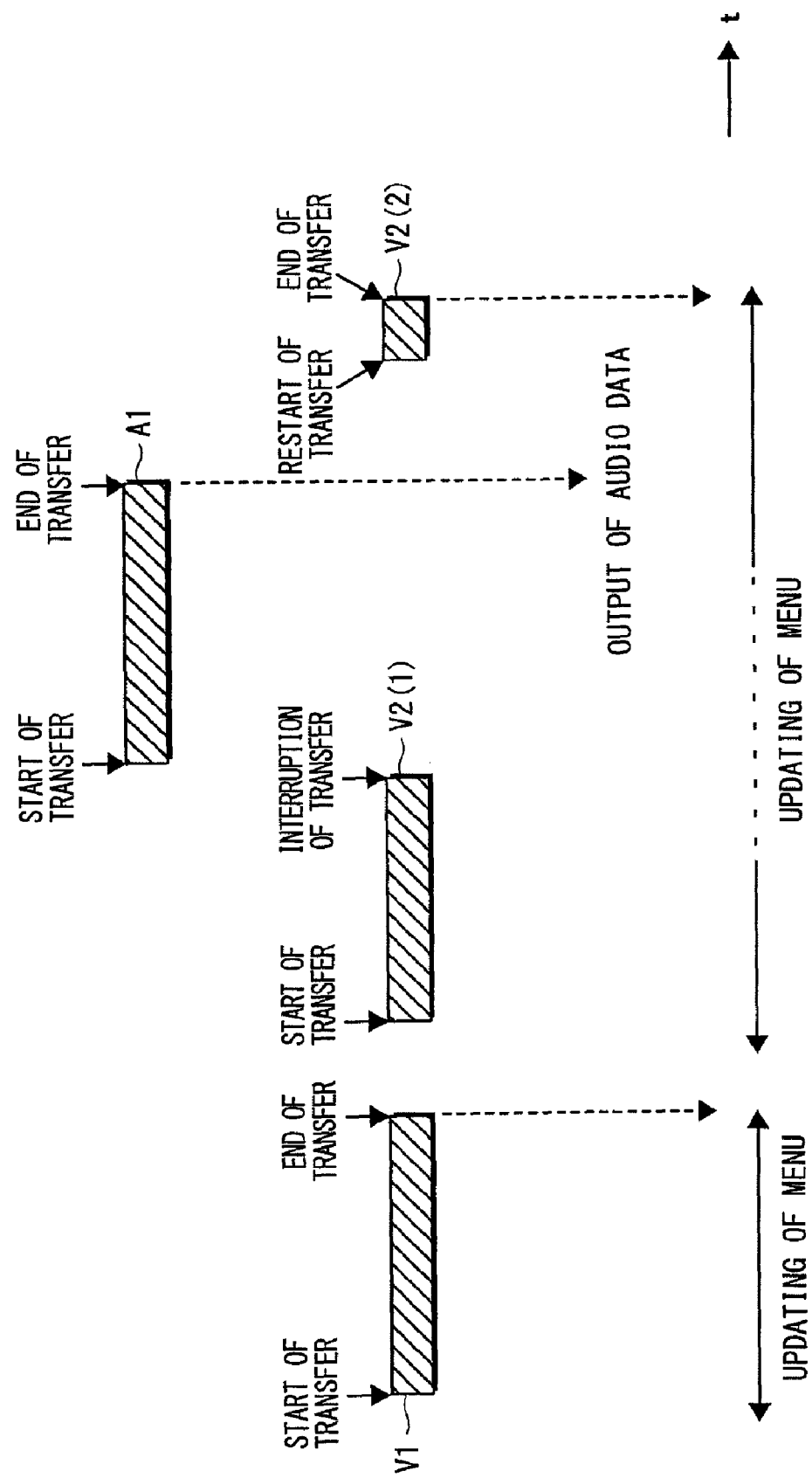

DATA TRANSFER DEVICE AND MOBILE TELEPHONE

TECHNICAL FIELD

The present invention relates to a data transfer device that reads data from a memory, performs cryptographic processing on the data, and writes the resultant data into the memory.

BACKGROUND ART

In recent years, cryptographic techniques have been used for data of contents to be stored in a storage medium, data transmitted and received via a network, and so on.

Apparatuses that handle data to which such cryptographic techniques have been applied include a data transfer device that reads data from a memory, performs cryptographic processing on the data, and writes the processed data into the memory. Here, the term "data transfer" means that the series of operations, namely the reading of the data, the encryption of the data, and the writing of the encrypted data. The term "cryptographic processing" means encryption of data and decryption of encrypted data.

For example, in the case of a communication apparatus such as a mobile phone, copyrighted data such as movie data and music data stored in the storage of the apparatus has been encrypted in advance. Accordingly, to playback the data, it is necessary for the apparatus to once decrypt the data. For this purpose, a data transfer device included in the apparatus performs cryptographic processing (i.e. decryption) on the encrypted data read from the storage, and writes the resultant data into the memory.

Also, if audio data relating voice communications has been encrypted as well, the data transfer device once reads the audio data, performs the cryptographic processing on the data, and writes the resultant data into the memory.

Meanwhile, some of such communication apparatuses have a multitask function, that is, a function to execute a plurality of processes in parallel.

With use of the multitask function, the apparatus can perform, for example, voice communications and playback of image data stored in the storage in parallel.

In this case, if the data transfer device can not perform cryptographic processing on different pieces of data at the same time, it is necessary to switch between the transfer of the image data and transfer of the audio data. Here, the voice communications should be realized with strict immediacy. Therefore, it is sometimes necessary to perform the transfer of the audio data by interrupting the transfer of the image data, in order to realize QOS (Quality of Service) by ensuring a certain communication speed.

For transferring different types of data in the above-described manner, there has been a suggestion of a certain cryptographic processing device. According to this suggestion, the cryptographic processing device is capable of interrupting transfer of low-priority data in order to transfer high-priority data, depending on the type of the cryptographic algorithm and cryptographic processing mode applied (see Patent Document 1).

FIG. 9 is a functional block diagram of the cryptographic processing device disclosed in the Patent Document 1.

A cryptographic processing device 1000 illustrated in FIG. 1 has a structure in which a DMAC 1004 performs the following operations according to instructions from a CPU 1001: The DMAC 1004 reads data stored in a data storage memory 1002 and inputs the read data into a common key cryptosystem block 1007 or a hash block 1008 via a selector 1005, and writes the result of the processing by the common key cryptosystem block 1007 or the hash block 1008 into the data storage memory 1002 via a selector 1010. In the middle of the processing of low priority data performed by the common key cryptosystem block 1007 or the hash block 1008, the cryptographic processing device 1000 interrupts the processing and stores intermediate results of the processing in an IV register 1006 or an IV register 1009 so that the cryptographic processing device 1000 first completes the processing of high-priority data, and then resumes the processing of the low-priority data.

Patent Document 1: Japanese Laid-open Patent Application Publication No. 2006-39000

DISCLOSURE OF THE INVENTION

Problem to be Solved by the Invention

In the conventional cryptographic processing device described above, transfer of low-priority data is interrupted when it becomes necessary to transfer high-priority data during the transfer of the low-priority data.

FIG. 10 shows operations of the cryptographic processing device applied in, for example, a mobile telephone apparatus. FIG. 10 shows how the cryptographic processing device transfers image data and audio data.

In the cryptographic processing device, the DMAC 1004 reads the image data and the audio data in units of data blocks, and sequentially inputs the data blocks into the common key cryptosystem block 1007. The common key cryptosystem block 1007 performs the cryptographic processing on the input data blocks. The example in FIG. 10 shows two data blocks (V1-V2) as the image data, and one data block (A1) as the audio data.

In this example, the image data is given a low priority, and the audio data is given a high priority. During the transfer of the second data block (V2) of the image data, when required to transfer the data block (A1) of the audio data for ensuring the QoS, the cryptographic processing device interrupts the transfer of the second data block (V2) of the image data, and starts the transfer of the data block (A1) of the audio data (An example of the image data that is given a low priority is data to be used for updating the menu screen on the display, and an example of the audio data that is given a high priority is data to be transferred in voice communications). Accordingly, as FIG. 10 shows, the cryptographic processing device transfers only a part (V2(1)) of the data block (V2) first, and starts transfer of the rest (v2(2)) of the data block (V2) after completing the transfer of the audio data block (A1).

In this way, the transfer of the image data is interrupted due to the transfer of the audio data. This might cause delay of the transfer of the image data, and result in delay of the updating of the menu screen on the display. If this is the case, the user might feel that the transition of the menu screen is awkward.

In view of this problem, the present invention aims to bring a balance between high Qos for transfer of high-priority data and quick response in the transfer of low-priority data, into a data transfer device that reads data from a memory, performs cryptographic processing on the data, and writes the result of the processing into the memory.

Means for Solving the Problem

In order to achieve the object mentioned above, one aspect of the present invention provides a data transfer device that receives an instruction to transfer first-type data or second-type data, selects and reads one of the first-type data and the second-type data from a memory according to the instruction, performs cryptographic processing on the read one, and writes a result of the cryptographic processing into the memory, the data transfer device comprising: a cryptographic processing unit operable to perform the cryptographic processing on input data and output a result of the cryptographic processing; a transfer unit operable to transfer data between the memory and the cryptographic processing unit; a condition information storage unit storing condition information that is based on a cryptosystem pertaining to the first-type data and used as a criterion of judgment on whether to switch a transfer target from the first-type data to the second-type data; and a judgment unit operable, on receipt of an instruction to transfer the second-type data during the transfer of the first-type data, to make the judgment based on a size of an un-transferred part of the first-type data that has not been transferred and the condition information, wherein the transfer unit switches the transfer target according to the instruction to transfer the second-type data and a result of the judgment.

Here, the transfer performed by the transfer unit means a series of operations including reading of a type of data from the memory, inputting of the read data into the cryptographic processing unit, and writing of the result output from the cryptographic processing unit into the memory.

ADVANTAGEOUS EFFECTS OF THE INVENTION

With the stated structure, when it becomes necessary to transfer the second-type data during the transfer of the first-type data, the image transfer device as an embodiment of the present invention judges whether to continue the transfer of the first-type data or switches the transfer target to the second-type data, according to the size of the un-transferred part of the first-type data and the condition information. According to the data transfer device, the user can control the transfer by the transfer unit by setting the condition information. For example, if the size of the un-transferred part is so large that the transfer start of the second-type data will be affected, the data transfer device may start the transfer of the second-type data by interrupting the transfer of the first-type data in the middle, and if the size of the un-transferred part is not so large that the transfer start of the second-type data will not be affected, the data transfer device may complete the transfer of the first-type data that is currently being transferred. This brings a balance between the QoS for the second-type data and the quick response in the transfer of the first-type data. If the first-type data is the low-priority data and the second-type data is the high-priority data, it is possible to bring a balance between the QoS for the high-priority data and the quick response in the transfer of the low-priority data.

In the data transfer device, the cryptographic processing unit may perform the cryptographic processing in batches each having a prescribed size, the condition information storage unit may store, as the condition information, (a) a first threshold of a size of the first-type data that the transfer unit transfers within a prescribed period according to a cryptographic algorithm applied to the first-type data and (b) a second threshold of a difference between the size of the un-transferred part and a size of resultant data of the cryptographic processing performed on the un-transferred part, and the transfer unit may immediately switch the transfer target if the judgment unit judges that (a) the size of the un-transferred part is greater than the first threshold and/or (b) a residual of the size of the un-transferred part with respect to the prescribed size is greater than the second threshold, and may switch the transfer target after completing the transfer of the first-type data if the judgment unit judges that (a) the size of the un-transferred part is not greater than the first threshold and (b) the residual is not greater than the second threshold.

With the stated structure, the data transfer device completes the transfer of the first-type data currently being transferred if it is judged from the cryptographic algorithm applied to the first-type data that the transfer does not affect the start of the transfer of the second-type data, and if the size of the resultant data of the cryptographic processing that will not be output on the assumption that the transfer unit inputs the un-transferred part into the cryptographic processing unit (i.e. the residual of the size of the un-transferred part with respect to the unit size of the cryptographic processing) is not greater than the threshold.

For example, in the case where the cryptographic processing unit performs the cryptographic processing in batches each having a prescribed size, if the size of the un-transferred part is not an integral multiple of the prescribed size, the size of the resultant data of the cryptographic processing to be output will be smaller than the first-type data input from the transfer unit to the cryptographic processing unit, and this causes a difference. If this difference is large, the upper level program that uses the result, which the transfer unit writes into the memory, might not be able to use the result. For example, in the case of image data, if the program for rendering an image with use of the result of the cryptographic processing might not be able to render the image due to missing part of the resultant data. In this way, if the result of the cryptographic processing can not be used even if the un-transferred part of the first-type data currently being transferred is input into the cryptographic processing, the value of the difference that causes such a situation may be set to the threshold as the condition information, and the data transfer device may switch between the transfer of the first-type data and the transfer of the second-type data.

In the data transfer device, the condition information storage unit may store, as the condition information, a size of the first-type data that the transfer unit transfers within a prescribed period according to a cryptographic algorithm applied to the first-type data, the prescribed period may be an allowable period from the receipt of the instruction to transfer the second-type data, which is provided for the transfer unit to complete the transfer of the first-type data, the transfer unit may immediately switch the transfer target on the receipt of the instruction to transfer the second-type data if the judgment unit judges that the size of the un-transferred part is greater than the condition information, and may switch the transfer target after completing the transfer of the first-type data if the judgment unit judges that the size of the un-transferred part is not greater than the condition information.

With the stated structure, the data transfer device completes the first-type data that is currently being transferred if it is judged from the cryptographic algorithm applied to the first-type data that the transfer of the first-type data does not affect the start of the transfer of the second-type data. On the other hand, if it is judged that the size of the un-transferred part affects the start of the transfer of the second-type data, the data transfer device interrupts the transfer of the first-type data and starts the transfer of the second-type data.

In the data transfer device, the cryptographic processing unit may perform the cryptographic processing in batches each having a prescribed size, the transfer unit may read the first data from the memory, input part or all of the first data to the cryptographic processing unit, and write a result of the cryptographic processing into the memory, the condition information storage unit may store, as the condition information, a threshold of a difference between the size of the un-transferred part and a size of resultant data of the cryptographic processing performed on the un-transferred part, and the transfer unit may immediately switch the transfer target on the receipt of the instruction to transfer the second-type data if the judgment unit judges that a residual of the size of the un-transferred part with respect to the prescribed size is greater than the condition information, and may switch the transfer target after completing the transfer of the first-type data if the judgment unit judges that the residual is not greater than the condition information.

With the stated structure, the data transfer device interrupts the transfer of the first-type data currently being transferred and starts the transfer of the second-type data if it is judged from the size of the un-transferred part of the first-type data and the unit size of the cryptographic processing that the size of the resultant data of the cryptographic processing that will not be output from the cryptographic processing unit on the assumption that the transfer unit inputs the un-transferred part into the cryptographic processing unit (i.e. the residual of the size of the un-transferred part with respect to the unit size of the cryptographic processing) is greater than the threshold.

In the data transfer device, each of the first-type data and the second-type data may be consisted of at least one frame that includes a pair of a header and a payload, the cryptographic processing unit may perform the cryptographic processing on the payload of each of the first-type data and the second-type data, the transfer unit may transfer data by, for each of the first-type data and the second-type data, inputting the payload into the cryptographic processing unit and writing the result of the cryptographic processing output from the cryptographic processing unit and the header into the memory, the difference may be a residual of a size of the payload included in the un-transferred part with respect to the prescribed size, and the transfer unit may immediately switch the transfer target on the receipt of the instruction to transfer the second-type data if the judgment unit judges that the size of the payload included in the first-type data is greater than the condition information.

With the stated structure, since the transfer units inputs only the payloads into the cryptographic processing unit and does not input the headers, the cryptographic processing unit can perform the cryptographic processing without regard to the borders between the headers and the payloads.

In the data transfer device, the first-type data may be in one of a plurality of data formats each having a different payload size, and the judging unit may make the judgment by determining the size of the un-transferred part according to the one of the plurality of data formats.

With the stated structure, the data transfer device can compare the data size of the payloads included in the un-transferred part and the condition information, based on the data format of the first-type data.

The data transfer device may be applied to a mobile telephone apparatus that has a function to perform audio communications and display image data, wherein the first-type data may be the image data, the second-type data may be audio data for the audio communications, the condition information storage unit stores the condition information that is based on the cryptosystem pertaining to the image data and used as the criterion of the judgment on whether to switch the transfer target from the image data to the audio data during the transfer of the image data, the judgment unit may make the judgment on the receipt of the instruction to transfer the audio data during the transfer of the image data, based on the size of the un-transferred part of the image data that has not been transferred and the condition information, and the transfer unit may switch the transfer target according to the instruction to transfer the audio data and the result of the judgment.

With the stated structure, in the mobile telephone apparatus, if the data transfer device receives an instruction to transfer the audio data, which requires real time performance, while transferring image data, the data transfer device judges whether to continue the transfer of the image data or switches the transfer target to the audio data, based on the condition information and the size of the un-transferred part, which has not been transferred by the transfer unit.

The mobile telephone apparatus may further comprise a transfer instruction unit operable to transmit, to the judgment unit, an instruction to transfer the audio data, wherein on receipt of the instruction to transfer the audio data from the transfer instruction unit, the judgment unit may make the judgment based on the size of the un-transferred part of the image data and the condition information.

With the stated structure, the judgment unit judges whether to switch the transfer target according to the instruction from the mobile telephone apparatus.

BRIEF DESCRIPTION OF THE DRAWINGS

FIG. 4 shows a table stored in an interruption timing judgment register 101*a;*

FIG. 10 shows operations of the conventional cryptographic processing device 1000.

EXPLANATION OF REFERENCES

Figure 1:
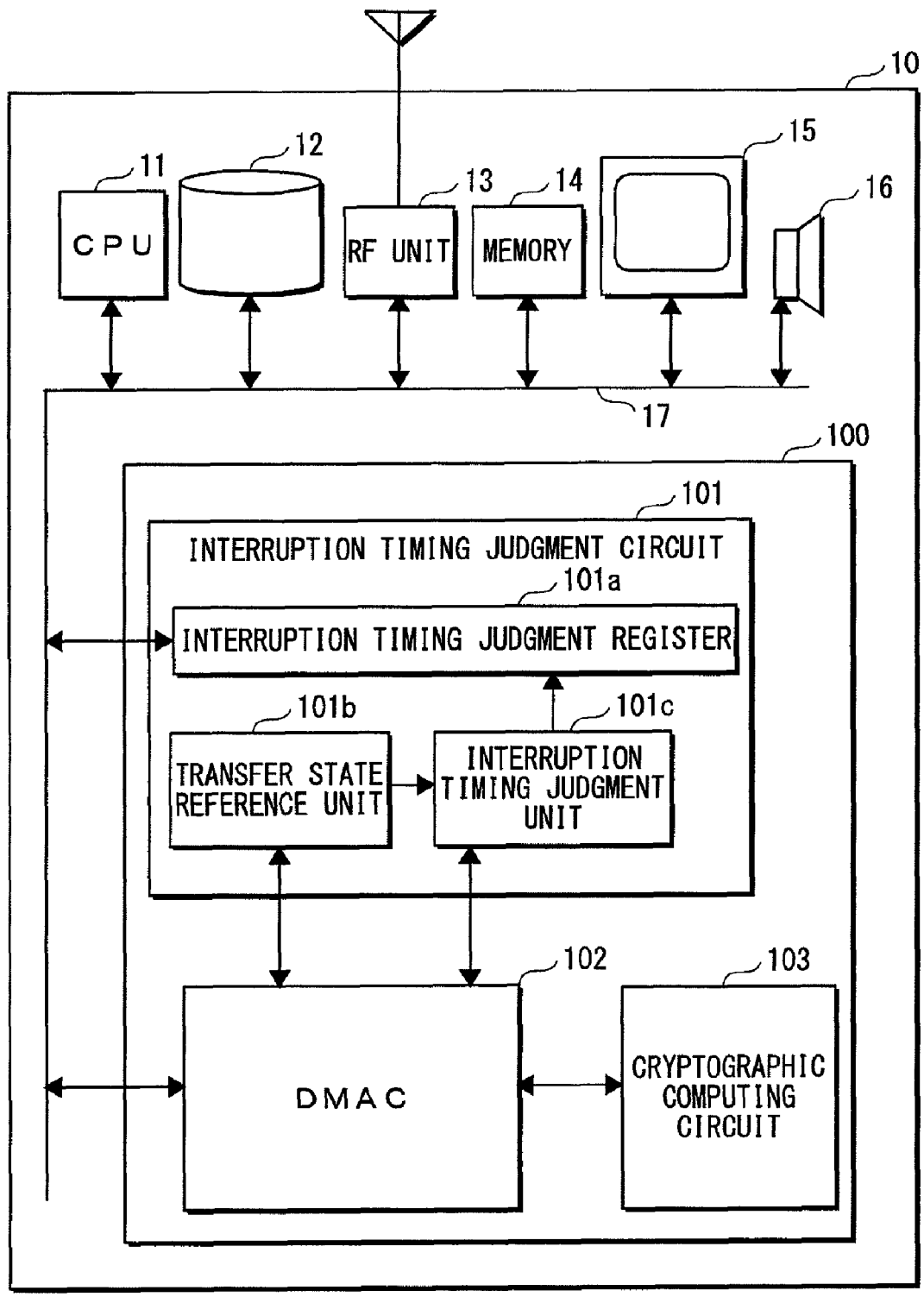
FIG. 1 is a functional block diagram showing the structure of a cryptographic processing device 100 pertaining to an embodiment of the present invention.

10: mobile telephone apparatus
11: CPU
12: storage unit
13: RF unit
14: memory
15: display
16: speaker
17: bus
100: cryptographic processing device
101: interruption timing judgment circuit
102: DMAC
103: cryptographic computing circuit

BEST MODE FOR CARRYING OUT THE INVENTION

The following explains an embodiment of the present invention with reference to the drawings.
1. Structure
The following explains a cryptographic processing device 100 as an embodiment of a data transfer device of the present invention.

FIG. 1 is a block diagram showing the structure of the cryptographic processing device 100.

The cryptographic processing device 100 is embodied as a component included in a mobile telephone apparatus 10, for example.

As FIG. 1 shows, the cryptographic processing device 100 includes an interruption timing judgment circuit 101, a direct memory access controller (DMAC) 102, and a cryptographic computing circuit 103.

The cryptographic processing device 100 is connected to other components of the mobile telephone apparatus 10 via a bus 17. Specifically, the cryptographic processing device 100 is connected to a CPU (Central Processing Unit) 11, a storage unit 12, an RF unit 14, a memory 14, a display 15 and a speaker 16.

The CPU 11 is a processor that has a function to control each component of the mobile telephone apparatus 10. For example, the CPU 11 has a function to instruct the DMAC 102 of the cryptographic processing device 100 to perform data transfer. The CPU 11 also has a function to notify the interruption timing judgment circuit 101 of a cryptographic processing algorithm and a cryptographic processing mode applied to data to be transferred that is stored in the memory 14, a function to notify the cryptographic processing device 100 of the format of the data, and so on. The cryptographic processing algorithm is, for example, the C2, the AES (Advanced Encryption Standard), or the like. The cryptographic processing mode is, for example, the ECB (Electronic Code Book) mode, the CBC (Cipher Block Chaining) mode, the counter mode, or the like. The data format is, for example, the GIF (Graphics Interchange Format), the JPEG (Joint Photographic Experts Group), or the like. The CPU 11 also has a function to execute programs stored in the storage unit 12.

The memory 14 is a work memory for storing data that has been encrypted, and embodied as a RAM (Random Access Memory), for example. Specifically, according to instructions from the CPU 11, the memory 14 temporarily stores image data stored in the storage unit 12, which is to be subject to the cryptographic processing by the cryptographic processing device 10, and audio data to be processed by the RF unit 13.

The storage unit 12 is for storing data, and embodied as a HDD (Hard Disk Drive), for example. In this embodiment, it is assumed that the storage unit 12 stores image data of a menu screen to be displayed on the display 15 and an image-rendering program to be executed by the CPU 11 to display the image data on the display 15.

The RF unit 13 has a function to perform modulation and demodulation of data in order to realize wireless communications. In this embodiment, it is assumed that the RF unit 13 processes audio data for voice communications as well.

The display 15 is for displaying image data, and embodied as a LCD (Liquid Crystal Display), for example.

The speaker 16 is for outputting audio data.

The bus 17 is a signal line for connecting the CPU 11, the storage unit 12, the RF unit 14, the memory 14, the display 15, the speaker 16, and the cryptographic processing device 100 with each other.

The DMAC 102 in the cryptographic processing device 100 has a function to read data from the memory 14 in units of blocks each having a prescribed fixed length, and to input payloads of the read blocks into the cryptographic computing circuit 103. Also, the DMAC 102 has a function to perform data transfer by writing the result of the cryptographic processing received from the cryptographic computing circuit 103 into the memory 14, together with the headers. Among pieces of data stored in the memory 14, the DMAC 102 selects data to be input into the cryptographic computing circuit 104, according to instructions from the interruption timing judgment circuit 101.

The interruption timing judgment circuit 101 has a function to control interruption and resumption of transfer of low-priority data when the DMAC 102 receives, from the CPU 11, an instruction to transfer high-priority data, during the transfer of the low-priority data. The interruption timing judgment circuit 101 includes an interruption timing judgment register 101a, a transfer state reference unit 101b and interruption timing judgment unit 101c.

The interruption timing judgment register 101a stores therein a table (described later) used by the interruption timing judgment unit 101c to judge the timing of interrupting the transfer by the DMAC 102.

The transfer state reference unit 101b has a function to monitor how many bytes among blocks read from the memory 14 the DMAC 102 has input into the cryptographic computing circuit 103, and transmit the result of the monitoring to the interruption timing judgment unit 101c.

The interruption timing judgment unit 101c has a function to judge whether the DMAC 102 should switch the transfer target, based on the table stored in the interruption timing judgment register 101a and the monitoring result (the number of the transferred bytes) of the transfer state reference unit 101b. According to the judgment result, the interruption timing judgment unit 101c transmits, to the DMAC 102, an instruction signal to switch the target data to be transferred to the cryptographic computing circuit 103.

The cryptographic computing circuit 103 has a function to perform cryptographic processing on the payload input from the DMAC 102, in prescribed cryptographic processing units, and to output the result of the cryptographic processing to the DMAC 102.

2. Data 2-1. Data Structure

Next, the following describes the structure of data on which the cryptographic processing device 100 performs the cryptographic processing.

Figure 2:
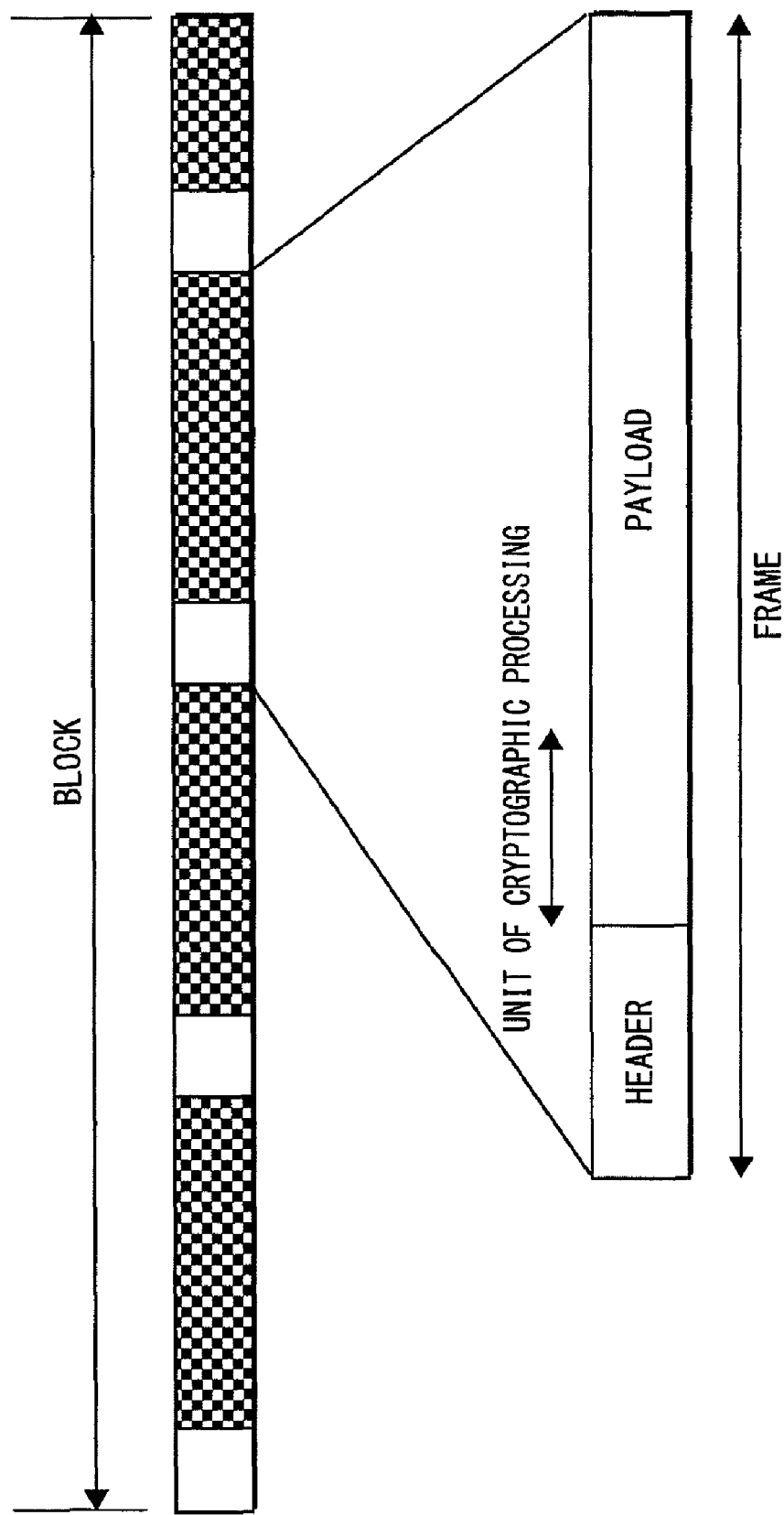
FIG. 2 shows the structure of data handled by the cryptographic processing device 100.

FIG. 2 shows the data structure.

The data is consisted of frames, each including a header and a payload.

The header includes management information, such as information of a data format, a cryptographic processing algorithm, and a cryptographic processing mode. The header is not the target of the cryptographic processing.

The payload is the main body of the data, and the target of the cryptographic processing.

The actual sizes of the header and the payload vary depending on the data type (format), such as the JPEG and the GIF. For example, in the case where the format is the AAC (Advanced Audio Code), the header length is 7 bytes (fixed length), and the payload length is a variable length. In the case where the format is MP3 (MPEG-1 Audio Layer-3), the header length is 4 bytes (fixed length) and the payload length is a variable length.

In FIG. 2, one of the prescribed cryptographic processing units, in which the cryptographic computing circuit 103 performs the cryptographic processing, is indicated by an arrow. This unit is determined according to the cryptographic processing algorithm applied to the data as the target of the cryptographic processing. For example, in the case where the cryptographic processing algorithm is the C2, the unit size of the cryptographic processing is 8 bytes. In the case where the cryptographic processing algorithm is the AES, the unit size of the cryptographic processing is 16 bytes.

Each of the blocks, which are units in which the DMAC reads data from the memory 14, includes a plurality of frames. The number of the blocks is not necessarily an integral multiple of the number of the frames. In other words, the last frame included in the block may not have a complete length.

Figure 3:
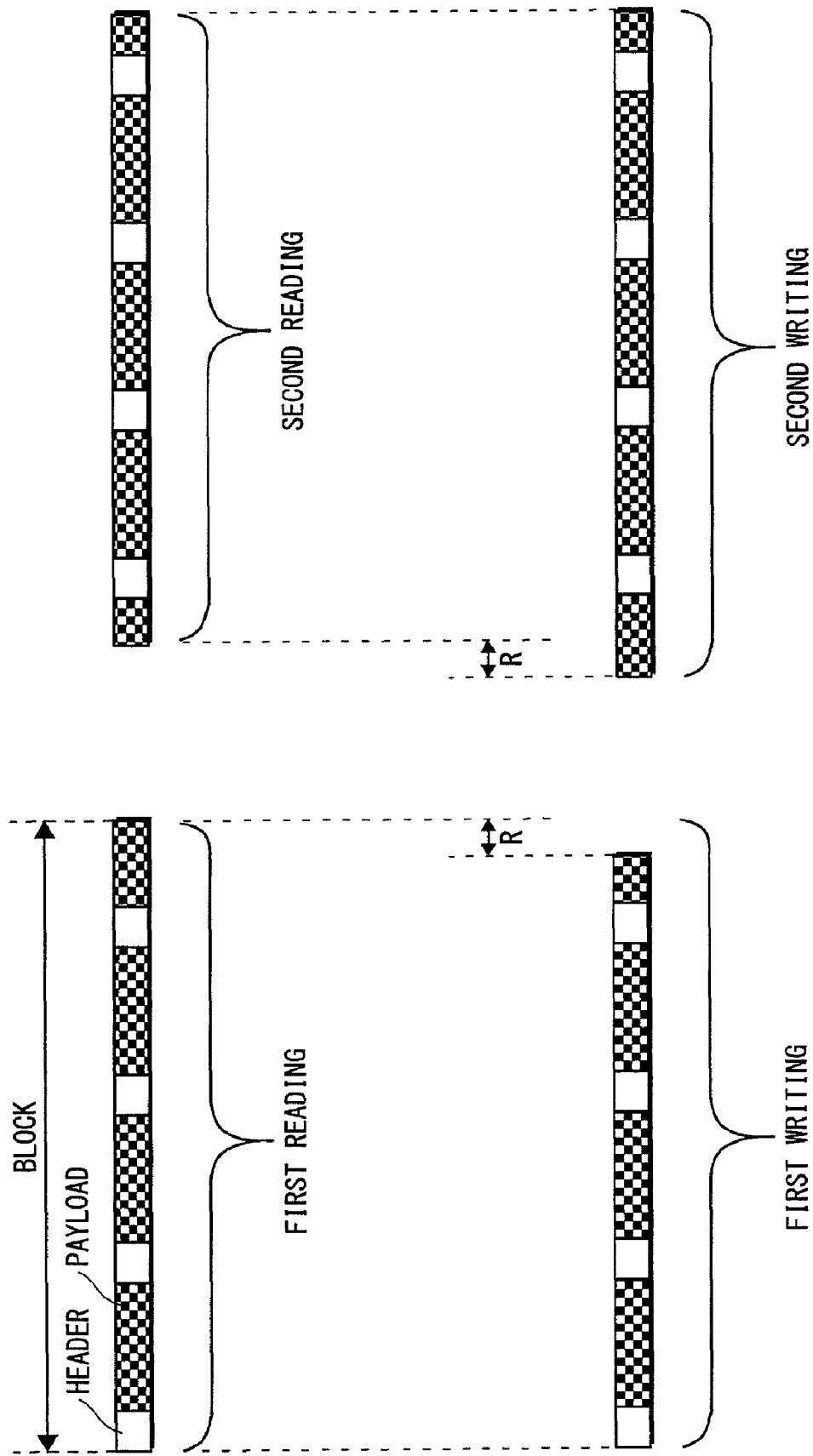
FIG. 3 shows the structure of data transferred by a DMAC 102.

FIG. 3 shows the data transferred by the DMAC 102. In FIG. 3, the upper tier shows a single data block that the DMAC 102 reads from the memory 14, and the lower tier shows data that the DMAC 102 writes into the memory 14. The data of the lower tier includes the headers and the result of the cryptographic processing. On the left side of FIG. 3, it is illustrated that the $n^{th}$ block is read and written into the memory 14. On the right side of FIG. 3, it is illustrated that the $(n+1)^{th}$ block is read and written into the memory 14.

As the upper tier shows, the DMAC 102 reads a single data block at a time from the memory 14. Firstly, the $n^{th}$ block is read from the memory 14, and the payloads included in the block are input into the cryptographic computing circuit 103. Here, if the total size of the payloads is not an integral multiple of the unit size of the cryptographic processing, the cryptographic computing circuit 103 can not perform the cryptographic processing on all the input data at a time, and part of the data remains unprocessed (residual data). The residual data is indicated by an arrow R in FIG. 3.

Since the cryptographic computing circuit 103 can not perform the cryptographic processing on all the input payloads at a time, the cryptographic computing circuit 103 processes the data smaller than the input data, and outputs the processed data to the DMAC 102. The residual data R is temporarily stored by the cryptographic computing circuit 103. As a result, the DMAC 102 writes the data that is smaller than the read data into the memory 14.

Next, the DMAC 102 reads the $(n+1)^{th}$ block that follows the $n^{th}$ block. Then, the cryptographic computing circuit 103 performs the cryptographic processing on the residual data R, which has been temporarily stored, together with the read payloads. The cryptographic computing circuit 103 performs the cryptographic processing on the data larger than the input data, and outputs the processed data to the DMAC 102. As a result, the DMAC 102 writes the data that is larger than the read data into the memory 14.

In this way, the if the total size of the payloads is not an integral multiple of the unit size of the cryptographic processing, the cryptographic computing circuit 103 can not perform the cryptographic processing on all the data at the $n^{th}$ input, and the residual data R occurs. To process the residual data R, it is required to wait for the $(n+1)^{th}$ input.

The data amount of the residual data R is determined as follows, based on the cryptographic processing algorithm of the data, the unit size of the cryptographic processing performed by the cryptographic computing circuit 103, and the payload data amount included in the block.

For example, in the case where the cryptographic processing algorithm of the data is AES, the unit size of the cryptographic processing by the cryptographic computing circuit 103 is 16 bytes.

Assume that the data amount of the payloads included in the block is 3000 bytes. Note that that the data amount of the payloads is determined by the data format.

If the data amount (3000 bytes) of the payloads is divided by the unit size (16 bytes) of the cryptographic processing by the cryptographic computing circuit 103, the residue is 8 bytes. This means that the size of the residual data R is 8 bytes.

2-2. Table

The following explains a table 200 stored in the interruption timing judgment register 101a.

FIG. 4 shows the data structure of the table 200.

The table 200 is generated for image data, and each entry includes a data type 201, a judgment necessity 202, an un-input data threshold 203, and a residual data threshold 204.

The data type 201 is a number that uniquely represents a type of image data that the DMAC 102 inputs into the cryptographic computing circuit 103. Here, the type shows either the cryptographic processing algorithm or the data format. For example, image data in the JPEG format to which the AES is to be applied as the cryptographic processing algorithm is represented as a data type 1, and image data in the GIF format to which the C2 is to be applied as the cryptographic processing algorithm is represented as a data type 2. FIG. 4 shows sixteen different data types as examples.

The judgment necessity 202 shows, for each piece of image data whose data type is indicated by the data type 201, whether to cause the DMAC 102 to interrupt transfer of the image data and start transfer of audio data when the DMAC 102 receives, from the CPU 11, an instruction to transfer the audio data during the transfer of the image data. For example, FIG. 4 shows that image data whose data type 201 is "1" requires the judgment, and image data whose data type is "2" does not require the judgment.

With regard to image data that does not require the judgment, the transfer of the image data by the DMAC 102 is to be interrupted immediately. With regard to image data that requires the judgment, the judgment is performed, and in necessary, the transfer of the image data by the DMAC 102 is to be interrupted. "Unnecessary" is applied to image data that does not have significant influence even if the cryptographic processing for the image data by the cryptographic computing circuit 103 is delayed. For example, it is applied to image data with very low priority, image data that does not require real time performance unlike image data used for updating of the menu screen, and so on.

On the other hand, "Necessary" is applied to image data that requires real time performance such as image data used for updating of the menu screen, and so on.

The un-input data threshold 203 is applied only to image data whose judgment necessity 202 shows that the judgment is necessary. The un-input data threshold 203 shows a threshold used for judgment as to whether to cause the DMAC 102 to interrupt transfer of the image data and start transfer of audio data when the DMAC 102 receives an instruction to transfer the audio data during the transfer of the image data. Specifically, the un-input data threshold 203 shows a threshold of the number of bytes of data that has not been input into the cryptographic computing circuit 103. This is obtained by subtracting the number of bytes of data that has been already input by the DMAC 102, which the transfer state reference unit 101b has been monitoring, from the number of bytes of the payloads included in the single block. If the number of bytes of data that has not been input is not greater than the un-input data threshold 203, the interruption timing judgment unit 101c instructs the DMAC 102 not to interrupt the input of the data that has not been input. If the number of bytes of data that has not been input is greater than the un-input data threshold 203, the interruption timing judgment unit 101c instructs the DMAC 102 to interrupt the input of the data that has not been input.

The residual data threshold 204 shows a threshold used together with the un-input data threshold 203 for judgment as to whether to cause the DMAC 102 to interrupt transfer of the image data and start transfer of audio data when the DMAC 102 receives an instruction to transfer the audio data during the transfer of the image data. Specifically, the residual data threshold 204 shows a threshold of the number of bytes of the residual data R of the case where the total size of the payloads included in the block is not an integral multiple of the unit size of the cryptographic processing by the cryptographic computing circuit 103. If the number of bytes of the residual data R is smaller than the residual data threshold 204, the interruption timing judgment unit 101c instructs the DMAC 102 not to interrupt the input of the data that has not been input. If the number of bytes of the residual data R is not smaller than the residual data threshold 204, the interruption timing judgment unit 101c instructs the DMAC 102 to interrupt the input of the data that has not been input.

The table 200 is generated by a user, such as the developer of the mobile telephone apparatus 10, and prestored in the interruption timing judgment register 101a.

The un-input data threshold 203 and the residual data threshold 204 may be determined by the user, according to the QoS of the audio data to be processed by the RF unit 13.

2-3. Un-Input Data Threshold 203

The un-input data threshold 203 is determined based on the QoS of the audio data, the cryptographic processing algorithm of the image data, and the data amount of the block.

For example, assume that in order to secure a certain quality level of voice communications, the DMAC 102 is required to start the transfer of the audio data within one second (1000 ms) after the CPU 11 instructs the interruption timing judgment circuit 101 to transfer the audio data.

Also assume that the unit size of the block handled by the DMAC 102 is 3200 bytes.

In such a case, the user determines the un-input data threshold 203 in the following manner.

For example, regarding the image data whose data type 201 is 1, if the cryptographic processing algorithm of the image data is the AES, the unit size for the cryptographic processing is 16 bytes. Assume that the cryptographic computing circuit 103 requires 300 ms to process a single 16-byte unit of the data when performing the cryptographic processing on the data. Also assume that the DMAC 102 requires 320 ms to read and write a single block (3200 bytes) from and to the memory 14 (0.1 ms per 1 byte). In this case, "32 bytes" may be set to the un-input data threshold 203. This is for the following reason. If the un-input data threshold 203 is 32 bytes, the DMAC 102 requires 923.2 ms in total for input of the un-input data which has not been input and writing to the memory 14. Therefore, if the size of the un-input data is smaller than 32 bytes, it is possible to start the transfer of the audio data within 1000 ms even if the DMAC 102 completes the input of the un-input data into the cryptographic computing circuit 104 and the writing of the result of the cryptographic processing into the memory 14. This means that it can be considered that the QoS of the audio data is secured.

In the same manner, for example, regarding the image data whose data type 201 is 4, if the cryptographic processing algorithm of the image data is the C2, the unit size for the cryptographic processing is 8 bytes. Assume that the cryptographic computing circuit 103 requires 100 ms to process a single 8-byte unit of the data when performing the cryptographic processing on the data. Also assume that the DMAC 102 requires 160 ms to read and write a single block (3200 bytes) from and to the memory 14 (0.05 ms per 1 byte). In this case, "64 bytes" may be set to the un-input data threshold 203. This is for the following reason. If the un-input data threshold 203 is 64 bytes, the DMAC 102 requires 963.2 ms in total for input of the un-input data which has not been input and writing to the memory 14. Therefore, if the size of the un-input data is smaller than 64 bytes, it is possible to start the transfer of the audio data within 1000 ms even if the DMAC 102 completes the input of the un-input data into the cryptographic computing circuit 104 and the writing of the result of the cryptographic processing into the memory 14. This means that it can be considered that the QoS of the audio data is secured.

2-4 Residual Data Threshold 204

The residual data threshold 204 is determined depending on the image-rendering program that is stored in the storage unit 12 of the mobile telephone apparatus 10.

The image-rendering program uses the results of the cryptographic processing performed by the cryptographic computing circuit 103, which has been written into the memory 14 by the transfer unit 102. Therefore, the image-rendering program is usually designed to execute the image rendering processing in units of the blocks, which are units in which the transfer unit 102 performs reading and writing. In this regard, an acceptable amount of missing data has been determined such that the image rendering program can perform the rendering even if a certain amount of the data is missing.

For example, in the case where the image rendering program accepts four bytes of missing data, "4 bytes" is set the residual data threshold.

Also, regarding the data whose data type 201 is 3, in the case where the image rendering program can not accept any missing data, "0" may be set to the residual data threshold.

As described above, the table 200 is configured and stored in the interruption timing judgment register 101a.

3. Operations

The following describes the operations of the cryptographic processing device.

Figure 5:
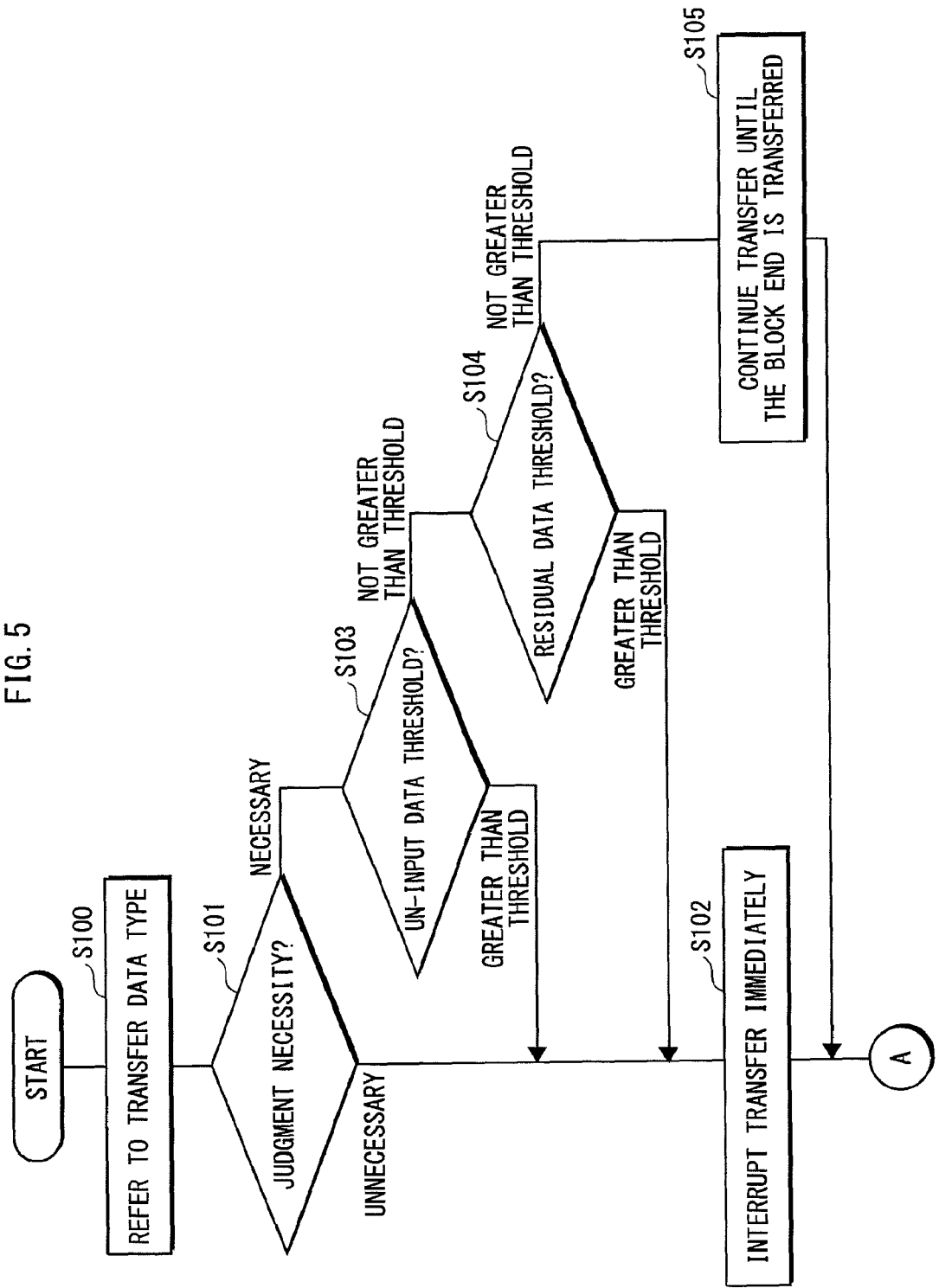
FIG. 5 is a first flowchart showing operations of the cryptographic processing device 100.
Figure 6:
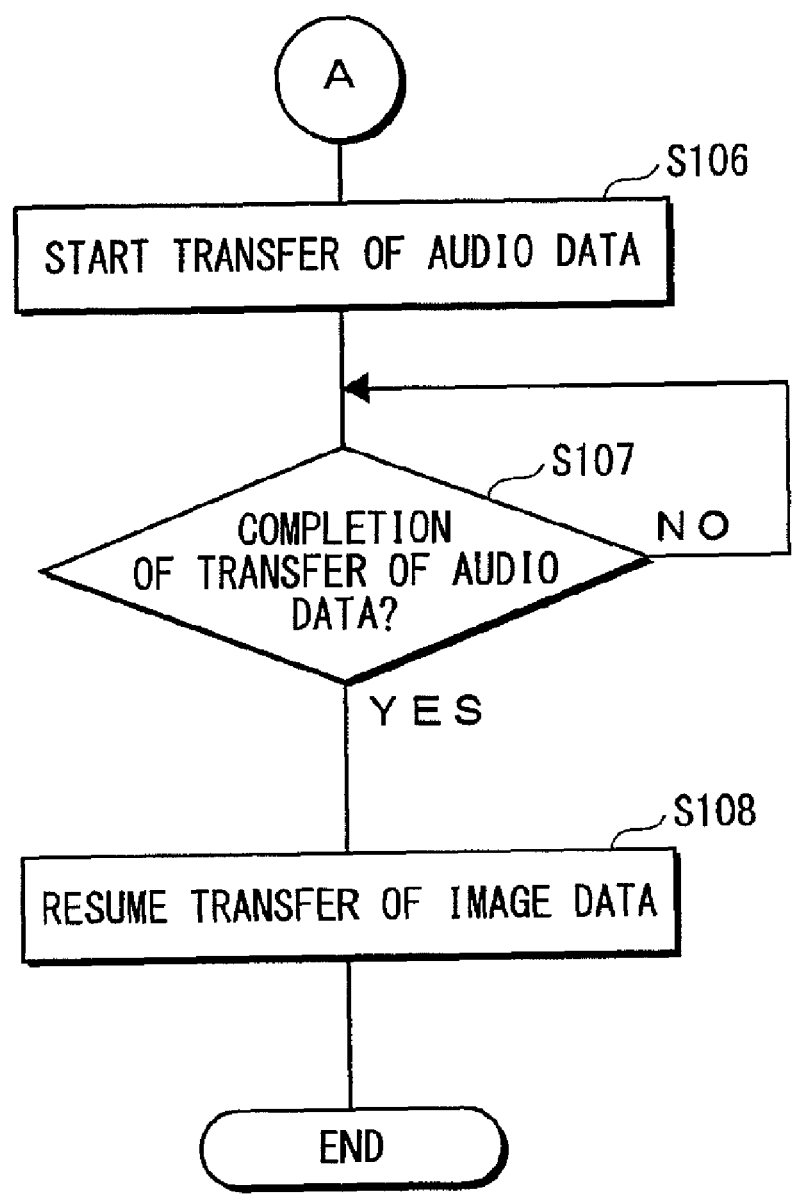
FIG. 6 is a second flowchart showing operations of the cryptographic processing device 100.

FIG. 5 and FIG. 6 are flowcharts showing operations performed by the cryptographic processing device 100 when receiving, from the CPU 11, the transfer instruction for performing the cryptographic processing on audio data while performing the cryptographic processing on image data. Here, the image data is for displaying a menu screen on the display 15, and the audio data relates to voice communications.

While the cryptographic processing device 100 is performing the cryptographic processing on the image data, when the RF unit 13 receives the audio data relating to voice communications, the CPU 11 detects the receipt and transmits an instruction to transfer the audio data, to the interruption timing judgment circuit 101.

Upon receiving the instruction to transfer the audio data from the CPU 11, the interruption timing judgment unit 101c refers to the table 200 stored in the interruption timing judgment register 101a to check the type of the image data that is being transferred by the DMAC 102 to the cryptographic computing circuit 103 (Step S100). At this step, the interruption timing judgment register 101a judges the data type 201 of the image data, based on the cryptographic processing algorithm and the data format of the image data, which have been notified by the CPU 11.

The interruption timing judgment unit 101c refers to the table 200 to check the judgment necessity 202 of the image data (Step S101).

The judgment necessity is "unnecessary" (Step S101: NO), the interruption timing judgment unit 101c instructs the DMAC 102 to immediately interrupt the transfer of the image data and switch the transfer target to the audio data (Step S102). Upon receipt of the instruction, the DMAC 102 interrupts the transfer of the image data, and starts the transfer of the audio data. The cryptographic computing circuit 103 starts decryption of the audio data input by the DMAC 102. Note that when interrupting the transfer of the image data, the DMAC 102 holds therein the address, within the memory 14, of a piece of the image data from which the transfer of the image data will be resumed.

On the other hand, if the judgment is necessary (Step S101: YES), the interruption timing judgment unit 101c calculates the amount of the un-input data based on the amount of the input data to the DMAC 102, which has been monitored by the transfer state reference unit 101b, and the block unit size, and calculates the calculated amount of the un-input data with the un-input data threshold 203 of the table 200 (Step S103).

If the un-input data amount is greater than the number of bytes indicated by the un-input data threshold 203 (Step S103: GREATER THAN THRESHOLD), the interruption timing judgment unit 101c instructs the DMAC 102 to immediately interrupt the transfer of the image data and switch the transfer target to the audio data (Step S102). Upon receipt of the instruction, the DMAC 102 interrupts the transfer of the image data, and starts the transfer of the audio data. The cryptographic computing circuit 103 starts decryption of the audio data input by the DMAC 102. Note that when interrupting the transfer of the image data, the DMAC 102 holds therein the address, within the memory 14, of a piece of the image data from which the transfer of the image data will be resumed.

On the other hand, if the un-input data amount is not greater than the number of bytes indicated by the un-input data threshold 203 (Step S103: NOT GREATER THAN THRESHOLD), the interruption timing judgment unit 101c further compares the residual data threshold 204 of the table 200 and the amount of the residual data R, which is the residual of the data amount of the payloads in the block divided by the unit size of the decryption (Step S104).

If the data amount of the residual data R is greater than the number of bytes indicated by the residual data threshold 204 (Step S104: GREATER THAN THRESHOLD), the interruption timing judgment unit 101c instructs the DMAC 102 to immediately interrupt the transfer of the image data and switch the transfer target to the audio data (Step S102). Upon receipt of the instruction, the DMAC 102 interrupts the transfer of the image data, and starts the transfer of the audio data. The cryptographic computing circuit 103 starts decryption of the audio data input by the DMAC 102. Note that when interrupting the transfer of the image data, the DMAC 102 holds therein the address, within the memory 14, of a piece of the image data from which the transfer of the image data will be resumed.

On the other hand, if the amount of the residual data R is not greater than the number of bytes indicated by the residual data threshold 204 (Step S104: NOT GREATER THAN THRESHOLD), the interruption timing judgment unit 101c instructs the DMAC 102 to complete the transfer of the entire block that is currently being transferred without interrupting the transfer (Step S105). Upon receipt of the instruction, the DMAC 102 continues the transfer of the image data until the end of the block is transferred, and when completing the transfer, holds therein the start address, within the memory 14, of the block that is to be transferred next.

At Step S105, the interruption timing judgment unit 101c interrupts the transfer by the DMAC 102 at the end of the block. Therefore, the DMAC 102 holds the start address within the memory 14 of the block that is to be transferred next, only when such a block still exists in the memory 14. If no such a block exists in the memory 14, that is, if the block of the image data, transferred according to the instruction from the CPU 11, is the final block, it is unnecessary for the DMAC 102 to hold therein the start address.

Upon completion of the transfer of the audio data by the DMAC 102 (Step S107: YES), the interruption timing judgment unit 101c instructs the DMAC 102 to resume the transfer of the image data that has been interrupted at Step S102 or Step S105 (Step S108).

At Step S108, if the DMAC 102 has interrupted the transfer of the image data at Step S102, the interruption timing judgment unit 101c instructs the DMAC 102 to resume the transfer of the image data from the address that has been temporarily held at Step S102. Upon receiving the instruction, the DMAC 102 starts reading of the data from the address within the memory 14, which has been held at Step S102.

If the DMAC 102 has interrupted the transfer of the image data at Step S105, if the address is temporarily held at Step S105, the interruption timing judgment unit 101c instructs the DMAC 102 to resume the transfer of the block from the address. Upon receiving the instruction, the DMAC 102 starts reading of the data from the address within the memory 14, which has been held at Step S105.

Figure 7:
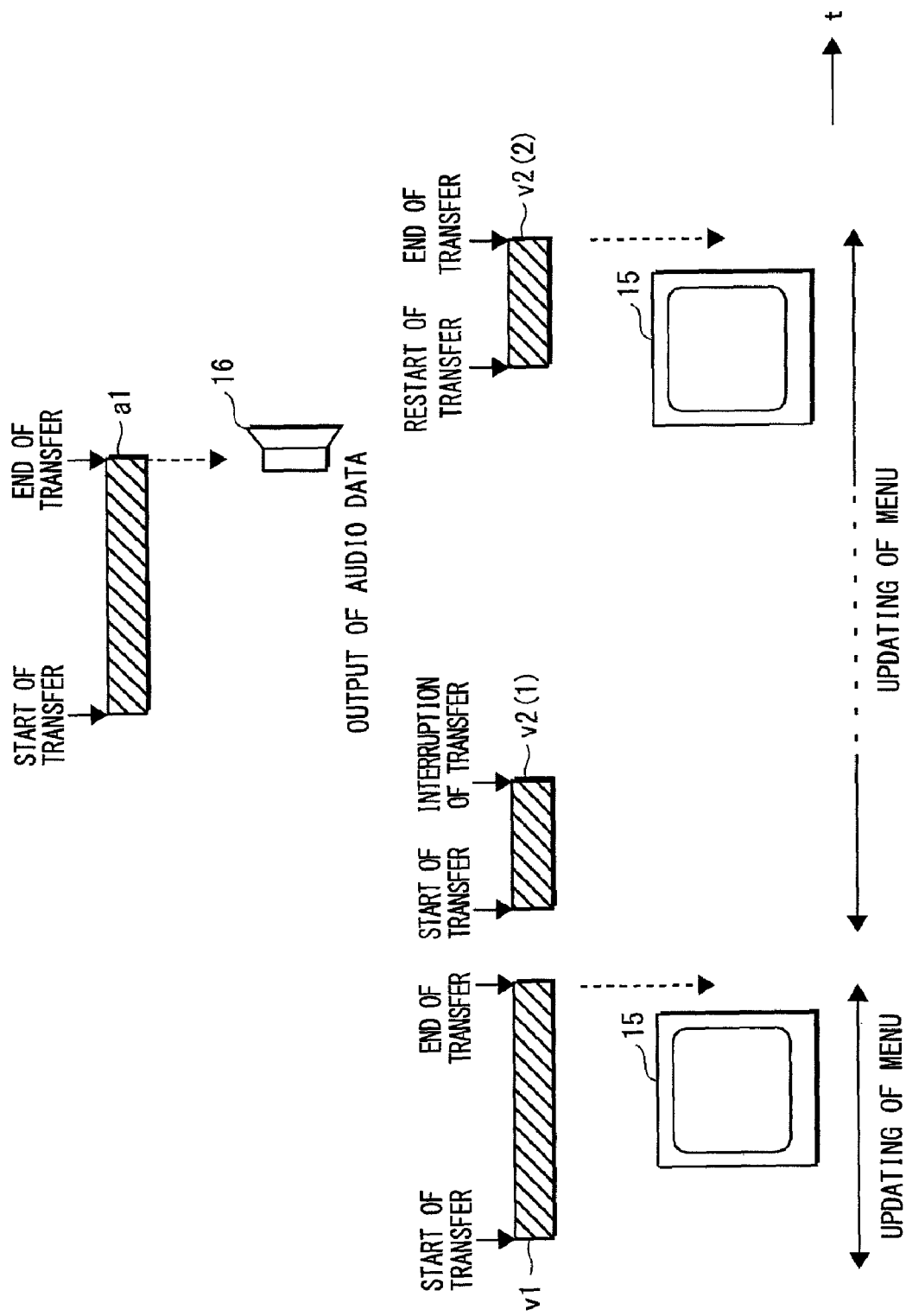
FIG. 7 shows operations of the cryptographic processing device 100 performed at step S103.

FIG. 7 shows operations of the cryptographic processing device 100 for interrupting the transfer of the image data after the processing of Step S102.

FIG. 7 illustrates that the DMAC 102 receives an instruction to transfer a single audio data block (a1) while transferring the second image data block (v2) among two image data blocks (v1 and v2).

The DMAC 102 interrupts the transfer of the second block (v2) in the middle (v2(1)), and starts the transfer of the audio data block (a1). At this moment, updating of the menu screen on the display 15 is interrupted. The audio data block (a1) will be transferred by the DMAC 102 within a prescribed period (1000 ms), and an audio signal relating to the audio data will be output from the speaker 16. After that, the transfer of the residual (v2(2)) of the second data block will be resumed, and the updating of the menu screen will be restarted.

Figure 8:
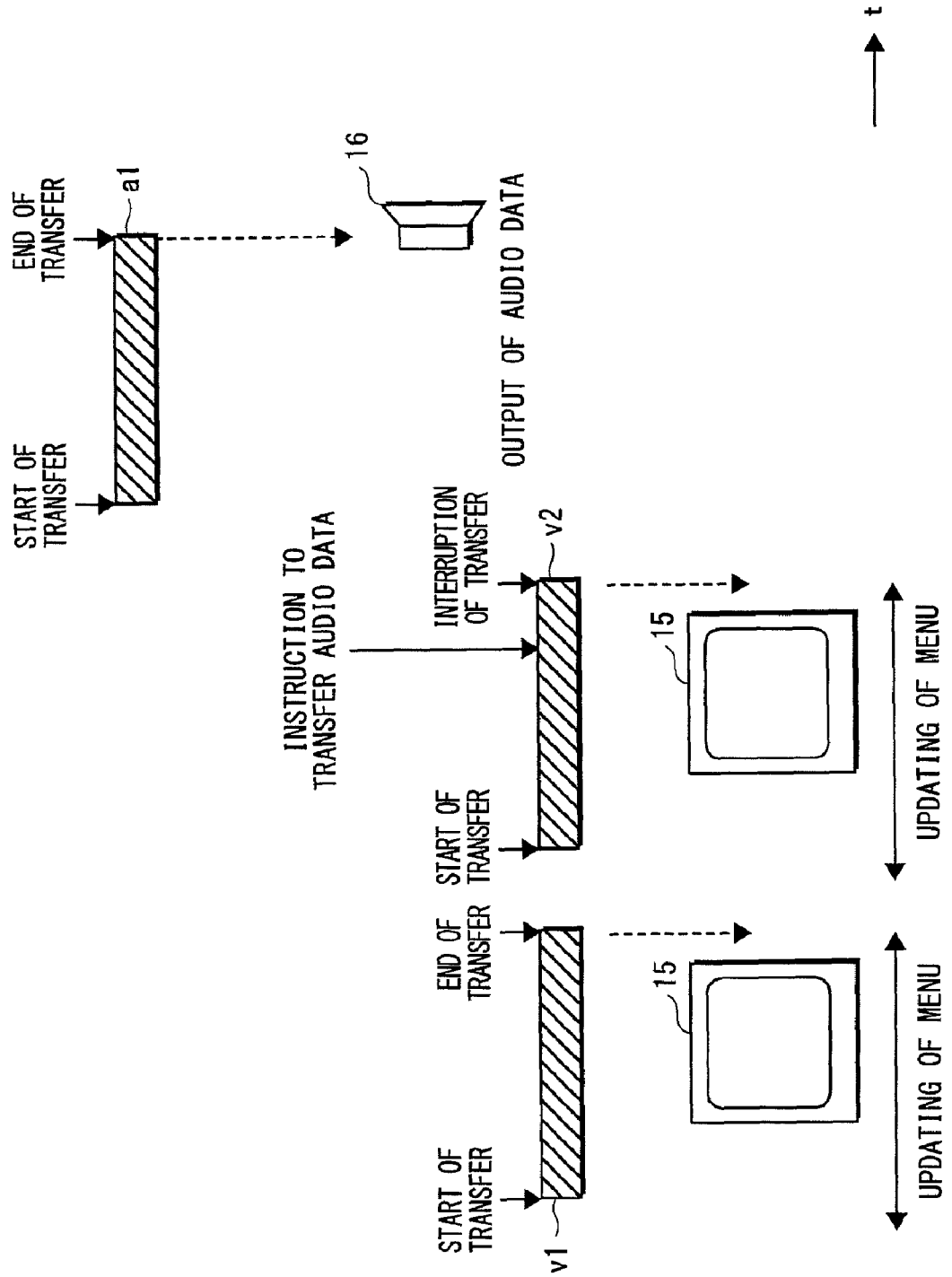
FIG. 8 shows operations of the cryptographic processing device 100 performed at step S104.
Figure 9:
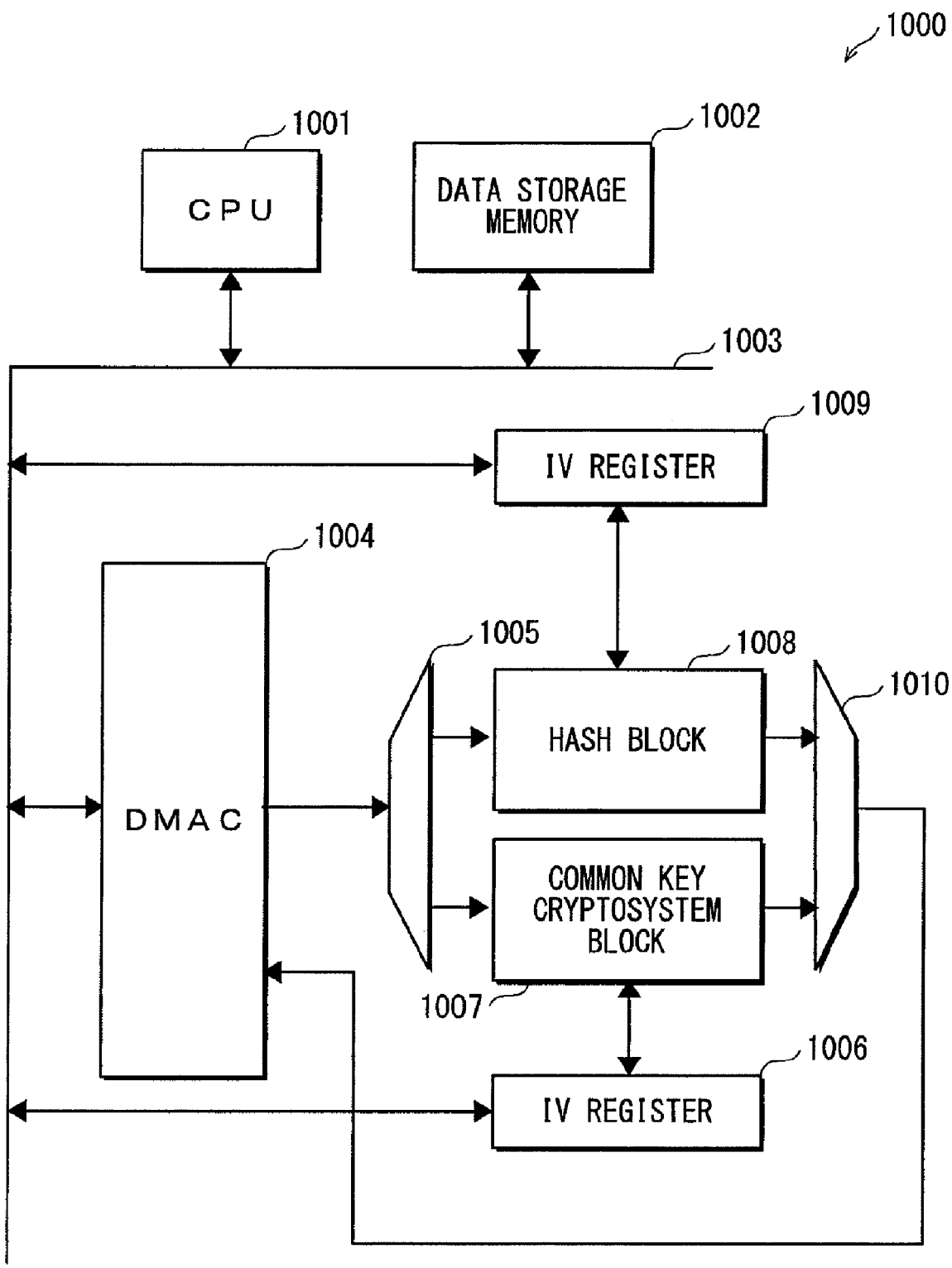
FIG. 9 is a functional block diagram showing the structure of a conventional cryptographic processing device 1000.

FIG. 8 shows operations of the cryptographic processing device 100 for interrupting the transfer of the image data after the processing of Step S105.

FIG. 8 illustrates that the DMAC 102 receives an instruction to transfer a single audio data block (a1) while transferring the second image data block (v2) among two image data blocks (v1 and v2).

The DMAC 102 starts the transfer of the audio data block (a1) after completing the transfer of the second image data block (v2). Accordingly, the updating of the menu screen on the display 15 is completed without interruption. The audio data block (a1) will be transferred by the DMAC 102 within a prescribed period (1000 ms), and an audio signal relating to the audio data will be output from the speaker 16.

With these operations, the cryptographic processing device 100 completes the transfer of the image data block that is currently being transferred if (i) the amount of the un-input data of the image data block is not large and does not affect the transfer start of the audio data block and (ii) the amount of the cryptographic processing result data (the amount of the residual of the un-input data divided by the block unit size), which will not be output even if the un-input data is input by the DMAC 102 into the cryptographic processing 103, is not greater than the residual data threshold 204.

In this way, if it is possible to complete the transfer of the entire image data block within 1000 ms (i.e. the period within which the transfer of the audio data block should be started), the DMAC 102 completes the transfer of the image data block. Therefore, the image rendering program can update the menu screen without delay, using the result of the cryptographic processing on the image data block.

If it is impossible for the DMCA 102 to complete the transfer of the entire image data block within 1000 ms, or even if possible, if it is impossible for the image rendering program to update the menu screen without delay using the result of the cryptographic processing on the image data block, the QoS of the audio data will be given the highest priority.

As described above, the cryptographic processing device 100 is capable of keeping a balance between high Qos for transfer of audio data and quick response in the transfer of image data.

Supplemental Explanations

The cryptographic processing device 100 pertaining to the present invention is described above based on the embodiment. However, as a mater of course, various modifications may be applied to the structure of the cryptographic processing device.

(1) In the embodiment, the cryptographic processing device 100 switches the transfer target of the DMAC 102 based on both the un-input data threshold 203 and the residual data threshold 205 of the table 200. However, this is only an example and the present invention is not limited to this. The transfer target may be switched based on only one of the thresholds.

Specifically, the switching of the transfer target based only on the un-input data threshold 203 may be performed as follows. When the DMAC 102 receives an instruction to transfer the audio data block during transfer of the image data block, the cryptographic processing device 100 compares the amount of the un-input data, which has not been input to the DMAC 102, with the un-input data threshold 203 (Step S103). If the amount of the un-input data is not greater than the amount indicated by the un-input data threshold 203 (Step S103: NOT GREATER THAN THRESHOLD), the interruption timing judgment unit 101c instructs the DMAC 102 to complete the transfer of the entire image block that is currently being transferred (until the end of the block is transferred) (Step S105).

The switching of the transfer target based only on the residual data threshold 204 may be performed as follows. When the DMAC 102 receives an instruction to transfer the audio data block during transfer of the image data block, the cryptographic processing device 100 compares the amount of the residual of the un-input data divided by the unit size of the cryptographic processing with the residual data threshold 204 (Step S104). If the residual is not greater than the residual data threshold 204 (Step S104: NOT GREATER THAN THRESHOLD), the interruption timing judgment unit 101c instructs the DMAC 102 to complete the transfer of the entire image block that is currently being transferred (until the end of the block is transferred) (Step S105).

(2) In the embodiment, the cryptographic processing device 100 performs the cryptographic processing on the image data that has been stored in the storage unit 12 in the mobile telephone apparatus 10 and loaded onto the memory 14. However, this is only an example and the present invention is not limited to this. For example, the cryptographic processing device 100 may perform the cryptographic processing on the image data that has been stored in an external storage medium such as an SD memory card (Secure Digital memory card) and loaded on the memory 14.

(3) In the embodiment, the cryptographic processing device 100 is incorporated in the mobile telephone apparatus 10. However, this only an example, and the present invention is not limited to this. The cryptographic processing device 100 may be incorporated into various apparatuses that perform cryptographic processing on data, such as digital broadcasting receivers and HDD (Hard Disk Drive) decoders.

(4) In the embodiment, the cryptographic processing device 100 performs the cryptographic processing on the image data as the first-type data, and the audio data as the second-type data. However, this is only an example, and the present invention is not limited to this. Data on which the cryptographic processing is currently being performed corresponds to the first-type data, and data on which the cryptographic processing should be performed by interrupting the cryptographic processing being performed on the former data corresponds to the second-type data. For example, the first-type data may be data that has been encrypted according to a first cryptographic processing algorithm, and the second-type data may be data that has been encrypted according to a second cryptographic processing algorithm that is different from the first cryptographic processing algorithm.

(5) In the embodiment, the cryptographic processing device 100 is explained on the assumption that the size of the block as the unit of the transfer by the DMAC 102 is 2300 bytes. However, this is only an example, and the present invention is not limited to this. Various sizes can be taken depending on the specifications of the DMAC 102.

(6) In the embodiment, regarding the mobile telephone apparatus 10, it is assumed that the length of the period after the transfer instruction is transmitted to the interruption timing circuit judgment 101c, within which the DMAC 102 has to start the transfer of the second-type data, is 1000 ms. However, this is only an example, and the present invention is not limited to this. Various values may be taken depending on the specifications of the mobile telephone apparatus 10 and the specifications of the mobile communication service provider (i.e. the carrier) that the mobile telephone apparatus 10 belongs to.

(7) The cryptographic processing device 100 may be realized as a single-chip cryptographic processing circuit into which the interruption timing judgment resister 101, the DMAC 102 and the cryptographic computing circuit 103 are integrated. The cryptographic processing circuit may be called differently depending on the degree of the integration. For example, it may be called as IC (Integrated Circuit), LSI (Large Scale Integration), VLSI (Very Large Scale Integration), ULSI (Ultra-Large Scale Integration), and so on.

INDUSTRIAL APPLICABILITY

The data transfer device of the present invention is applicable to various apparatuses that have a mechanism for reading data from memory and performing cryptographic processing on the data, and writing the result of the cryptographic processing into the memory. The data transfer device of the present invention offers an advantage that it is possible to bring a balance between high Qos for transfer of high-priority data and quick response in transfer of low-priority data.

The invention claimed is:
1. A data transfer device that receives an instruction to transfer first-type data or second-type data, selects and reads one of the first-type data and the second-type data from a memory according to the instruction, performs cryptographic processing on the read one, and writes a result of the cryptographic processing into the memory, the data transfer device comprising:
   a cryptographic processing unit operable to perform the cryptographic processing on input data and output a result of the cryptographic processing;
   a transfer unit operable to transfer data between the memory and the cryptographic processing unit;
   a condition information storage unit storing condition information that is based on a cryptosystem pertaining to the first-type data and used as a criterion of judgment on whether to switch a transfer target from the first-type data to the second-type data; and a judgment unit operable, on receipt of an instruction to transfer the second-type data during the transfer of the first-type data, to make the judgment based on a size of an un-transferred part of the first-type data that has not been transferred and the condition information, wherein the transfer unit switches the transfer target according to the instruction to transfer the second-type data and a result of the judgment.

2. The data transfer device of claim 1, wherein the cryptographic processing unit performs the cryptographic processing in batches each having a prescribed size, the condition information storage unit stores, as the condition information, (a) a first threshold of a size of the first-type data that the transfer unit transfers within a prescribed period according to a cryptographic algorithm applied to the first-type data and (b) a second threshold of a difference between the size of the un-transferred part and a size of resultant data of the cryptographic processing performed on the un-transferred part, and the transfer unit immediately switches the transfer target if the judgment unit judges that (a) the size of the un-transferred part is greater than the first threshold and/or (b) a residual of the size of the un-transferred part with respect to the prescribed size is greater than the second threshold, and switches the transfer target after completing the transfer of the first-type data if the judgment unit judges that (a) the size of the un-transferred part is not greater than the first threshold and (b) the residual is not greater than the second threshold.

3. The data transfer device of claim 1, wherein the condition information storage unit stores, as the condition information, a size of the first-type data that the transfer unit transfers within a prescribed period according to a cryptographic algorithm applied to the first-type data, the prescribed period is an allowable period from the receipt of the instruction to transfer the second-type data, which is provided for the transfer unit to complete the transfer of the first-type data, the transfer unit immediately switches the transfer target on the receipt of the instruction to transfer the second-type data if the judgment unit judges that the size of the un-transferred part is greater than the condition information, and switches the transfer target after completing the transfer of the first-type data if the judgment unit judges that the size of the un-transferred part is not greater than the condition information.

4. The data transfer device of claim 1, wherein the cryptographic processing unit performs the cryptographic processing in batches each having a prescribed size, the transfer unit reads the first data from the memory, inputs part or all of the first data to the cryptographic processing unit, and writes a result of the cryptographic processing into the memory, the condition information storage unit stores, as the condition information, a threshold of a difference between the size of the un-transferred part and a size of resultant data of the cryptographic processing performed on the un-transferred part, and the transfer unit immediately switches the transfer target on the receipt of the instruction to transfer the second-type data if the judgment unit judges that a residual of the size of the un-transferred part with respect to the prescribed size is greater than the condition information, and switches the transfer target after completing the transfer of the first-type data if the judgment unit judges that the residual is not greater than the condition information.

5. The data transfer device of claim 2, wherein each of the first-type data and the second-type data is consisted of at least one frame that includes a pair of a header and a payload, the cryptographic processing unit performs the cryptographic processing on the payload of each of the first-type data and the second-type data, the transfer unit transfers data by, for each of the first-type data and the second-type data, inputting the payload into the cryptographic processing unit and writing the result of the cryptographic processing output from the cryptographic processing unit and the header into the memory, the difference is a residual of a size of the payload included in the un-transferred part with respect to the prescribed size, and the transfer unit immediately switches the transfer target on the receipt of the instruction to transfer the second-type data if the judgment unit judges that the size of the payload included in the first-type data is greater than the condition information.

6. The data transfer device of claim 5, wherein the first-type data is in one of a plurality of data formats each having a different payload size, and the judging unit makes the judgment by determining the size of the un-transferred part according to the one of the plurality of data formats.

7. A mobile telephone apparatus that includes the data transfer device of claim 1 and has a function to perform audio communications and display image data, wherein the first-type data is the image data, the second-type data is audio data for the audio communications, the condition information storage unit stores the condition information that is based on the cryptosystem pertaining to the image data and used as the criterion of the judgment on whether to switch the transfer target from the image data to the audio data during the transfer of the image data, the judgment unit makes the judgment on the receipt of the instruction to transfer the audio data during the transfer of the image data, based on the size of the un-transferred part of the image data that has not been transferred and the condition information, and the transfer unit switches the transfer target according to the instruction to transfer the audio data and the result of the judgment.

8. The mobile telephone apparatus of claim 7, further comprising a transfer instruction unit operable to transmit, to the judgment unit, an instruction to transfer the audio data, wherein on receipt of the instruction to transfer the audio data from the transfer instruction unit, the judgment unit makes the judgment based on the size of the un-transferred part of the image data and the condition information.

* * * * *